(12) United States Patent
Hagelskamp (10) Patent No.: US 9,897,201 B2
(45) Date of Patent: Feb. 20, 2018

(54) ELECTRO-HYDRAULIC FAILURE RECOVERY CONTROL FOR DUAL CLUTCH TRANSMISSION

(71) Applicant: Allison Transmission, Inc., Indianapolis, IN (US)

(72) Inventor: Bryan Hagelskamp, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 175 days.

(21) Appl. No.: 14/755,868

(22) Filed: Jun. 30, 2015

(65) Prior Publication Data

US 2015/0300484 A1    Oct. 22, 2015

Related U.S. Application Data

(63) Continuation of application No. 13/202,893, filed on Aug. 23, 2011, now Pat. No. 9,097,338.

(60) Provisional application No. 61/155,980, filed on Feb. 27, 2009, provisional application No. 61/176,227, filed on May 7, 2009.

(51) Int. Cl.
| | |
|---|---|
| *F16H 61/02* | (2006.01) |
| *F16H 61/12* | (2010.01) |
| *F16H 61/688* | (2006.01) |
| *F16H 61/16* | (2006.01) |

(52) U.S. Cl.
CPC ......... *F16H 61/12* (2013.01); *F16H 61/0206* (2013.01); *F16H 61/16* (2013.01); *F16H 61/688* (2013.01); *F16H 2061/1224* (2013.01); *F16H 2061/1232* (2013.01); *F16H 2061/1292* (2013.01); *Y10T 74/19153* (2015.01); *Y10T 74/19163* (2015.01); *Y10T 74/19251* (2015.01)

(58) Field of Classification Search
CPC ...... F16H 61/12; F16H 61/0206; F16H 61/16; F16H 61/688; F16H 61/1224; F16H 61/1232; F16H 61/1292
See application file for complete search history.

(56) References Cited

U.S. PATENT DOCUMENTS

| | | | |
|---|---|---|---|
| 5,063,813 A | 11/1991 | Lentz et al. | |
| 5,211,083 A | 5/1993 | Hattori et al. | |
| (Continued) | | | |

FOREIGN PATENT DOCUMENTS

| | | | |
|---|---|---|---|
| CN | 1328937 A | 1/2002 | |
| CN | 1629521 A | 6/2005 | |
| (Continued) | | | |

OTHER PUBLICATIONS

Notification of Provisional Rejection from the Korean Intellectual Property Office for Application No. 10-2011-7020140, dated Apr. 20, 2016, 5 pages.

(Continued)

*Primary Examiner* — Jake Cook
(74) *Attorney, Agent, or Firm* — Banres & Thornburg LLP (57) ABSTRACT

A control for a multi-speed automatic vehicle transmission includes electrical and hydraulic components, such as pressure control valve systems in fluid communication with shift valves and electrohydraulic actuators. The control includes electrohydraulic features configured to enable the transmission to respond to an electrical failure whether the transmission is in neutral, a reverse range, or one of a plurality of forward ranges.

15 Claims, 7 Drawing Sheets

(56) References Cited

U.S. PATENT DOCUMENTS

| | | | |
|---|---|---|---|
| 5,507,706 A | 4/1996 | Jang et al. | |
| 5,582,559 A | 12/1996 | Jang et al. | |
| 5,667,453 A | 9/1997 | Jang et al. | |
| 5,733,221 A | 3/1998 | Jang | |
| 6,027,427 A | 2/2000 | Hwan | |
| 6,055,879 A | 5/2000 | Akiharu et al. | |
| 6,315,692 B1 | 11/2001 | Takahashi et al. | |
| 6,494,803 B2 | 12/2002 | Suzuki et al. | |
| 6,585,617 B1 | 7/2003 | Moorman et al. | |
| RE42,131 E | 2/2011 | Long et al. | |
| 7,896,769 B2 * | 3/2011 | Long | F16H 61/0206 475/123 |
| 8,070,637 B2 * | 12/2011 | Long | F16H 61/0206 475/119 |
| 8,387,476 B2 | 3/2013 | Buchanan et al. | |
| 8,479,903 B2 | 7/2013 | Yagi | |
| 9,097,338 B2 | 8/2015 | Hagelskamp | |
| 2003/0027678 A1 | 2/2003 | Long et al. | |
| 2007/0281816 A1 * | 12/2007 | Long | F16H 61/0206 475/116 |
| 2008/0190228 A1 | 8/2008 | Long et al. | |
| 2009/0258746 A1 * | 10/2009 | Long | F16H 61/0206 475/131 |

FOREIGN PATENT DOCUMENTS

| | | |
|---|---|---|
| CN | 1769744 A | 5/2006 |
| CN | 1854571 A | 11/2006 |
| CN | 1971100 A | 5/2007 |
| CN | 101109443 A | 1/2008 |
| CN | 101140030 A | 3/2008 |
| CN | 101245852 | 8/2008 |
| CN | 101583510 | 12/2012 |
| WO | 2008108977 | 9/2008 |

OTHER PUBLICATIONS

Search Report and Written Opinion from the State Intellectual Property Office for the People's Republic of China for Application No. 201080018791.0 dated Jan. 6, 2014, 21 pages.

International Preliminary Report of Patentability for Application No. PCT/US2010/025359, dated Aug. 30, 2011, 7 pages.

Examiner's Report from the Canadian Intellectual Property Office for Application No. 2,753,965, dated Jan. 5, 2016, 3 pages.

European Search Report for European Application No. 10746818. 3-2421/2401527 PCTUS2010025359, dated Dec. 10, 2012, 7 pages.

International Search Report and Written Opinion for Application No. PCT/US2010/025359, completed Apr. 5, 2014.

Notification of Provisional Rejection from the Korean Intellectual Property Office for Application No. 10-2011-7020140, dated Sep. 26, 2016, 3 pages.

Second Examiner's Report from the Canadian Intellectual Property Office for Application No. 2,753,965, dated Oct. 3, 2016, 4 pages.

First Office Action from the State Intellectual Property Office of the People's Republic of China for Application No. 2015101274713, dated Aug. 24, 2016, 8 pages.

Second Office Action from the State Intellectual Property Office of the People's Republic of China for Application No. 201080018791. 0, dated Aug. 26, 2014, 5 pages.

Third Office Action issued by the Canadian Intellectual Property Office for Application No. 2,753,965, dated Jun. 20, 2017, 3 pages.

* cited by examiner

FIG. 7

ELECTRO-HYDRAULIC FAILURE RECOVERY CONTROL FOR DUAL CLUTCH TRANSMISSION

CROSS REFERENCE TO RELATED APPLICATIONS

This application is a continuation application of and claims priority to U.S. application Ser. No. 13/202,893, entitled "ELECTRO-HYDRAULIC FAILURE RECOVERY CONTROL FOR DUAL CLUTCH TRANSMISSION," which was filed on Aug. 23, 2011 and which claims priority to U.S. Provisional Patent Application No. 61/155,980, filed on Feb. 27, 2009, and to U.S. Provisional Patent Application No. 61/176,227, filed on May 7, 2009. The above applications are incorporated herein by this reference in their entireties.

TECHNICAL FIELD

The present invention relates generally to transmissions for motor vehicles, and more particularly, to an electro-hydraulic failure recovery control for an automatic multi-speed transmission.

BACKGROUND

Many types of multi-speed transmissions are available for motor vehicles. In such transmissions, shifts from one operating mode, range, or ratio to another operating mode, range or ratio may be controlled electronically by a transmission control system that includes computer circuitry, programming logic, and fluid hydraulics installed in the vehicle. In general, an assembly of electro-hydraulic actuators (such as solenoids), hydraulic valves and fluid passages makes up an electro-hydraulic portion of the transmission control system. Electrical controls selectively actuate hydraulic valves, which control the pressure and direction of hydraulic fluid flow applied to torque transmitting mechanisms (such as clutches, brakes and the like) and other components of the transmission. The clutches or other torque transmitting mechanisms may be engaged and disengaged upon command to attain different operating modes, ranges or ratios for the vehicle.

Some of the design considerations for transmission control systems include shift quality, fuel economy, reliability and durability over a wide range of potential operating conditions. The range of operating conditions may include changes in the weight of the vehicle load, operating temperature, weather conditions, geographic conditions (such as altitude or humidity), and driver preferences. The configurations of component parts of the transmission and/or the transmission control system may vary. Variations may also occur in the reliability, durability and/or manufacturing tolerances of component parts of the transmission and/or control system.

If a failure or malfunction occurs in the transmission during vehicle operation, it may be desirable or necessary for the transmission control system to transition the vehicle to a safer or more desirable state until the failure can be addressed. In other instances, it may be desirable or necessary for the transmission control system to prevent the transmission from causing the vehicle to enter an operating mode that is known or believed to be undesirable or unsafe.

SUMMARY

In one embodiment, an electro-hydraulic control for a multi-speed vehicle transmission includes one or more shift valves. Each shift valve is configured to control engagement of a torque transmitting mechanism of the transmission to enable the transmission to selectively attain a plurality of forward ranges and at least one reverse range. The control also includes one or more trim valves. Each trim valve is in direct fluid communication with at least one of the shift valves. The control also includes a normally-high actuator operably coupled to each of the trim valves. The number of shift valves equals the number of trim valves and the number of normally-high actuators equals the number of trim valves.

In such embodiment, there are first, second, and third trim valves, and first, second, and third shift valves, where the first trim valve is in fluid communication with the first and second shift valves and the second shift valve is in fluid communication with the third shift valve. The second trim valve may be in fluid communication with the second shift valve. The third trim valve may be in fluid communication with the third shift valve. The control may include a first fluid passage coupled to a source of main fluid pressure, where the first fluid passage is in communication with a fluid chamber of the first trim valve when the first trim valve is stroked, the first fluid passage is in fluid communication with a fluid chamber of the first shift valve when the first shift valve is stroked, and the fluid chamber of the first shift valve is in direct fluid communication with a fluid chamber of a first torque transmitting mechanism of the transmission.

The control may also include a second fluid passage coupled to the first fluid passage, where the second fluid passage is in fluid communication with a fluid chamber of the second shift valve when the second shift valve is stroked and the second fluid passage is in fluid communication with the fluid chamber of the second shift valve when the second shift valve is destroked.

The control may also include a third fluid passage in fluid communication with the fluid chamber of the second shift valve when the second shift valve is stroked, wherein the third fluid passage is in fluid communication with the head of the third shift valve.

The control may also include a fourth fluid passage coupled to the source of main fluid pressure, wherein the fourth fluid passage is in fluid communication with a fluid chamber of the second trim valve when the second trim valve is stroked, the fourth fluid passage is in fluid communication with a second fluid chamber of the second shift valve when the second shift valve is stroked, and the second fluid chamber of the second shift valve is in direct fluid communication with a second torque transmitting mechanism of the transmission.

The control may also include a fifth fluid passage coupled to the source of main fluid pressure, wherein the fifth fluid passage is in fluid communication with a fluid chamber of the third trim valve when the third trim valve is stroked, the fifth fluid passage is in fluid communication with the fluid chamber of the third shift valve when the third shift valve is destroked, and the fluid chamber of the third shift valve is in direct fluid communication with a third torque transmitting mechanism of the transmission.

In another embodiment, an electrohydraulic control for a multi-speed automatic transmission includes a first plurality of trim valves each operably coupled to a normally-low actuator and each being in direct fluid communication with a fluid chamber of a torque transmitting mechanism of the transmission. The control also includes a second plurality of trim valves each operably coupled to a normally-high actuator. The control also includes a plurality of shift valves each being in fluid communication with one of the second plurality of trim valves and each being in direct fluid communication with a torque transmitting mechanism of the transmission. The control also includes at least one valve operable to control at least one shift fork of the transmission.

One or more of the shift valves may include a plurality of spaced-apart lands defining a plurality of fluid chambers, where at least one of the fluid chambers is in communication with at least one shift fork of the transmission. A first one of the trim valves may be configured to control application and release of the torque transmitting mechanism coupled to a first one of the shift valves and the first one of the trim valves may be configured to control the position of a second one of the shift valves. The at least one valve operable to control the at least one shift fork may be configured to control a position of a first shift fork and also to control a position of a second shift fork.

The control may include a plurality of fluid passages connecting the second plurality of trim valves to the plurality of shift valves. The configuration of fluid passages, shift valves, and trim valves may be configured to prevent fluid pressure from being applied to a first torque transmitting mechanism of the transmission when the transmission is in a first operating range comprising one of a neutral range and at least one reverse range, and to prevent fluid pressure from being applied to a second torque transmitting mechanism of the transmission when the transmission is in a second operating range comprising one of a first plurality of forward ranges, and to prevent fluid pressure from being applied to a third torque transmitting mechanism of the transmission when the transmission is in a third operating range comprising one of a second plurality of forward ranges different than the first plurality of forward ranges.

In another embodiment, a transmission failure recovery control for a dual clutch transmission includes first electrohydraulic means for recovering from an electrical failure by causing the transmission to attain a first failure recovery range if the transmission is in a reverse or neutral range when the failure occurs, second electrohydraulic means for recovering from an electrical failure by causing the transmission to attain a second failure recovery range if the transmission is in a low forward range when the failure occurs, and third electrohydraulic means for recovering from an electrical failure by causing the transmission to attain a third failure recovery range if the dual clutch transmission is in a high forward range when the failure occurs.

The first failure recovery range may be the neutral range, the low forward range may be one of a plurality of low forward ranges less than a sixth forward range, and the second failure recovery range may be the fourth forward range. The first failure recovery range may be the neutral range, the high forward range may be one of a plurality of high forward ranges greater than a fifth forward range, and the third failure recovery range may be the ninth forward range.

The control may include means for selectively blocking the application of at least one torque transmitting mechanism of the transmission. The control may include means for controlling a plurality of shift forks of the transmission. At least one of the first, second and third electrohydraulic means may also be configured to control at least one of the shift forks.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

The figures depict schematic illustrations. As such, the components may not be drawn to scale, and lines shown as connecting the various blocks and components shown therein represent connections which, in practice, may include one or more electrical, mechanical and/or fluid connections, passages, communication links, couplings or linkages, as will be understood by those skilled in the art and as described herein. In general, like structural elements on different figures refer to identical or functionally similar structural elements, although reference numbers may be omitted from certain views of the drawings for ease of illustration.

DETAILED DESCRIPTION

Aspects of the present invention are described with reference to illustrative embodiments shown in the accompanying drawings and described herein. While the present invention is described with reference to these illustrative embodiments, it should be understood that the present invention as claimed is not limited to the disclosed embodiments.

Described herein are failure recovery features that may be incorporated into the transmission control system for a multi-speed automatic transmission, such as a dual clutch automatic transmission. These features are generally designed to cause the transmission to shift to a pre-specified range in the event of an electrical failure. These features may be incorporated into a transmission control system alone or in combination with other control features, including but not limited to clutch blocking capabilities, multiplexing, double transition shifting, and reduced engine load at stop (RELS) capabilities.

Figure 1:
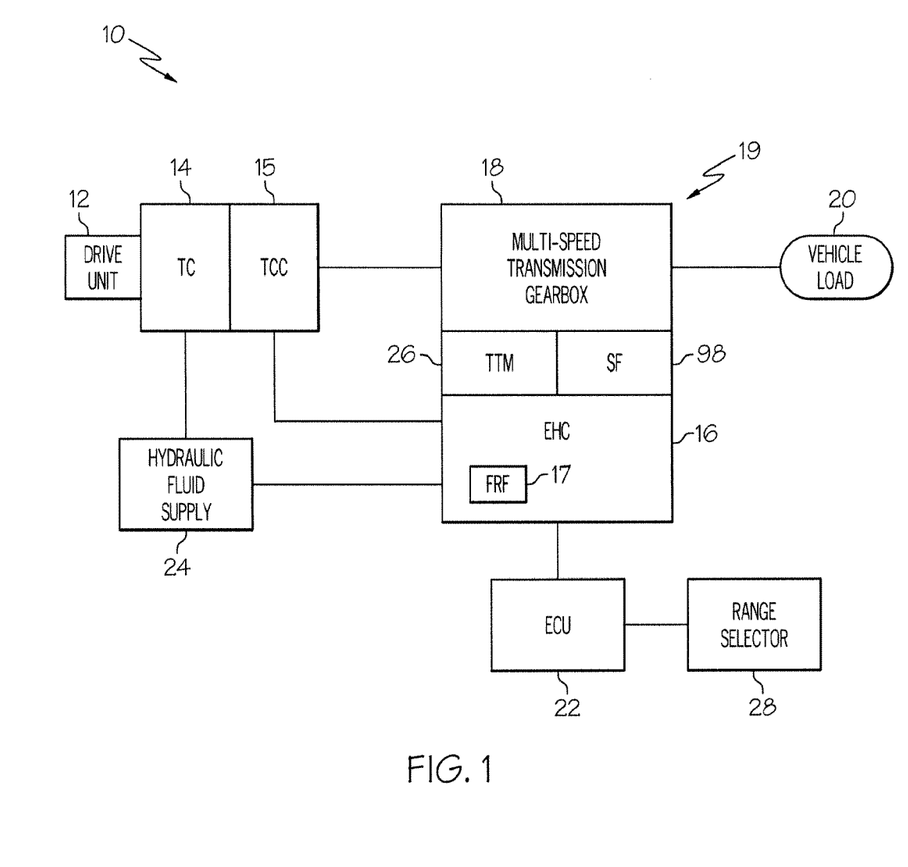
FIG. 1 is a simplified block diagram of an electrohydraulic control for a dual clutch transmission, including one or more failure recovery features, shown in the context of an exemplary vehicle powertrain.

In FIG. 1, control 16, including failure recovery features 17, is shown in the context of an exemplary powertrain 10 of a motor vehicle. In general, powertrain 10 includes a drive unit 12, a torque transferring apparatus 14, a multi-speed automatic transmission 19, and a torque transmitting mechanism 15 interposed between torque transferring apparatus 14 and transmission 19.

Drive unit 12 provides a torque output to torque transferring apparatus 14. Drive unit 12 may be an internal combustion engine of a compression-ignition type (i.e. diesel) or a spark-ignition type (i.e. gasoline), a hybrid or engine-electric motor combination, or the like.

Torque converter 14 selectively establishes a coupling between drive unit 12 and transmission 19 to convert and/or transfer torque output from drive unit 12 to transmission 19. As is well known, torque converters generally include a torque converter pump, turbine, and stator. Typically, torque converter 14 is equipped with at least one torque converter clutch 15.

A fluid supply 24 provides pressurized hydraulic fluid for use by torque converter 14 and electro-hydraulic control 16. In the illustrated embodiment of FIGS. 2-5, fluid supply 24 includes a main pump 81, a lube pump 82, and a sump or reservoir 84. During operation of the vehicle, pumps 81, 82 draw hydraulic fluid from sump or reservoir 84 and supply it to fluid circuits and valve systems of control 16 as described below.

An electrical control unit 22 includes computer circuitry and components configured to control operation of transmission 19 based on inputs from one or more elements of powertrain 10, such as drive unit 12, torque transferring apparatus 14, control 16, transmission 19, range selector 28, and/or other components. Control 22 processes these inputs and parameters and issues electrical control signals to various components of electro-hydraulic control 16.

A range selector 28 may be provided to enable selection of an operational range, mode, or ratio by a vehicle operator. Range selector 28 may include one or more push buttons, levers, or similar actuators that are selectable by a person in the vehicle. In response to a selection, range selector 28 may issue an electrical or hydraulic signal indicative of the selected range, mode or ratio.

Transmission 19 generally includes an input shaft, an output shaft, an assembly of gears 18, a plurality of gear-shifting torque transmitting mechanisms 26, and may include one or more shift forks 98. Gear assembly 18 generally includes a plurality of intermeshing gear sets that are concentric with and/or rotatable about one or more gear shafts.

In the illustrated embodiment, gear assembly 18 is a dual-clutch assembly that includes a main shaft, a pair of countershafts, and a plurality of gears rotatable about or with the main shaft and countershafts. More particularly, the illustrated embodiment of transmission 19 is a dual-clutch planetary transmission with five clutches (4 rotating, 1 stationary), and three shift forks. The rotating clutches are designated as C1, C2, C4 and C7 in the figures, while the stationary clutch is designated as C6. The three shift forks are designated as 1A/1B (shift fork 1), 2A/2B (shift fork 2) and 2RA/2RB (shift fork 3) in the figures. A schematic of an exemplary embodiment of gear assembly 18 is shown in Appendix A of U.S. Provisional Patent Application No. 61/155,980, filed Feb. 27, 2009.

The gear-shifting torque transmitting mechanisms 26 are selectively engageable and disengageable by electro-hydraulic control 16 to cause the vehicle to engage or release certain gears to assume one of a plurality of operational modes, ranges, or ratios at any given time. As such, mechanisms 26 are configured to selectively achieve a mechanical, fluid or friction coupling between components of powertrain 10 in response to inputs, conditions or changes in conditions. One or more of these elements may be friction devices or fluid-operated devices such as clutch- or brake-type devices. One or more of these elements may be stationary- or rotating-type devices. In general, each of the torque transmitting mechanisms 26 are operable independently of the other. The four rotating clutches C1, C2, C4, C7, and one stationary clutch C6, are shown schematically in FIG. 2.

The shift forks 98 may be operable to select or change the direction of operation of the vehicle. Shift fork or forks 98 may have at least a reverse ('R') position, a neutral ('N') position, and a forward ('F') position. Typically, changing the physical or mechanical position of shift fork or forks 98 causes control 16 to bring on the appropriate gearset to move the vehicle in the requested direction, i.e., either forward or reverse. The position of shift fork or forks 98 may be changed (i.e., from 'R' to 'F' or from 'N' to 'F') by action of the vehicle operator or may be electronically controlled (e.g., in response to signals received by control 22 from range selector 28). The shift forks 98 are shown schematically in FIG. 2.

Torque transmitting mechanisms 26 and shift forks 98 include fluid passages or chambers that are in fluid communication with hydraulic control elements of control 16 as shown in FIGS. 2-5 and described below, to control the shifting of gears during operation of transmission 19. The illustrated embodiment of transmission 19 provides ten forward ranges and two reverse ranges (a low reverse range and a high reverse range). In general, the first shift fork, 1A/1B, is engaged in the $1^{st}$, $3^{rd}$, $6^{th}$ and $8^{th}$ forward ranges; the second shift fork, 2A/2B, is engaged in the $2^{nd}$, $5^{th}$, $7^{th}$ and $10^{th}$ forward ranges and the third shift fork, 2RA/2RB, is engaged in the reverse 1 (low) and reverse 2 (high) ranges.

Also in the illustrated embodiment, during normal operation, torque transmitting mechanism C6 is applied in the low forward ranges and the reverse low range, while torque transmitting mechanism C7 is applied in the high forward ranges and the reverse high range. Further, in the illustrated embodiment, under normal operation, torque transmitting mechanism C1 is applied in the $1^{st}$, $3^{rd}$, $6^{th}$ and $8^{th}$ forward ranges; torque transmitting mechanism C2 is applied in the reverse low range, the reverse high range, and the $2^{nd}$, $5^{th}$, $7^{th}$ and $10^{th}$ forward ranges; and torque transmitting mechanism C4 is applied in the $4^{th}$ and $9^{th}$ forward ranges. A ratio table showing the gear ratios, steps, and clutches applied in each range of the illustrated embodiment is shown in Appendix A of U.S. Provisional Application No. 61/155,980.

While failure recovery features 17 are described herein in the context of an electro-hydraulic control for a dual clutch transmission, it will be understood by those skilled in the art that aspects of failure recovery features 17 are applicable to other types and configurations of transmissions. For example, aspects of failure recovery features 17 may be configured for use with other multi-speed transmissions that provide at least one reverse range, a neutral range, and a plurality of forward ranges.

According to the embodiment shown in FIGS. 2-5, electro-hydraulic control 16 includes a pressure control or "clutch trim" subassembly 194, a shift fork control subassembly 196, and a flow control subassembly 198. Pressure control subassembly 194, shift fork control subassembly 196, and flow control subassembly 198 are each in fluid communication with fluid supply 24 and with each other via a plurality of fluid circuits including a main pressure fluid circuit 202, a control main pressure fluid circuit 204, a cooler/lube circuit 206, and an exhaust circuit 210. Fluid circuits 202, 204, 206, and 210 are operably coupled to fluid supply 24 as shown. Subassemblies 194, 196, 198 and fluid circuits 202, 204, 206, and 210 include a plurality of valve systems, fluid passages and fluid chambers that are provided in a valve body housing or casing, which is installable in a vehicle as is known in the art.

Figure 2:
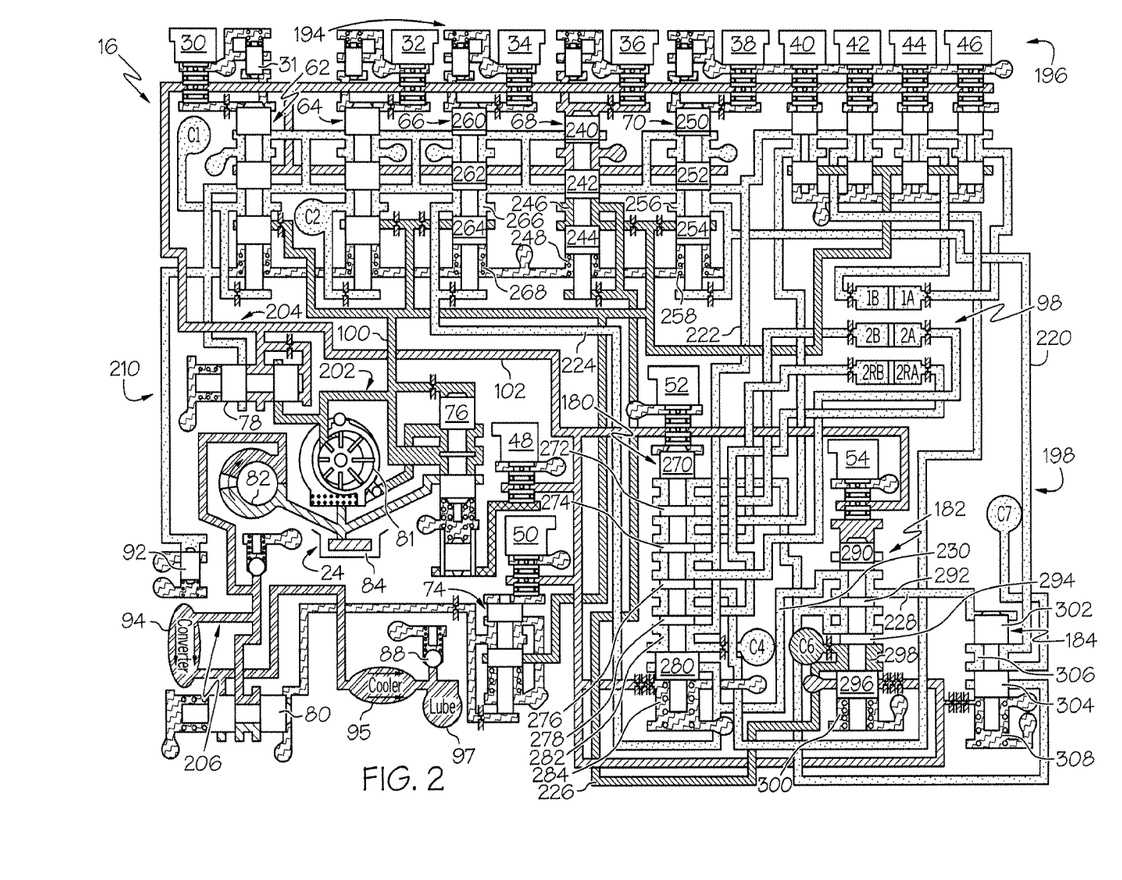
FIG. 2 is a schematic diagram of one embodiment of the electro-hydraulic control of FIG. 1, showing a configuration of fluid passages and fluid pressures for a neutral range in a normal operating mode.

Referring to FIG. 2, pressure control subassembly 194 includes a plurality of pressure control or "trim" systems 30, 32, 34, 36, 38. Shift fork control subassembly 196 includes a plurality of pressure control systems 40, 42, 44, 46. Flow control subassembly 198 includes a plurality of shift valve systems 180, 182, 184.

Main pressure circuit 202 supplies hydraulic fluid to various elements of control 16, at a main pressure via main passage 100. For example, main passage 100 is in direct fluid communication with clutch trim systems 30, 32, 34, 36, 38.

In the illustrated embodiment, fluid pressure supplied to main passage 100 is regulated by a main regulator valve assembly 48, 76. In general, the main pressure is defined by a range including a minimum system pressure and a maximum system pressure for main passage 100. In the illustrated embodiment, the main pressure is in the range of about 50-250 pounds per square inch (psi).

Main passage 100 is also in fluid communication with a control main regulator valve 78, which provides hydraulic fluid at a control pressure to control main circuit 204. Control main fluid circuit 204 provides control pressure directly to the actuators 30, 32, 34, 36, 38, 40, 42, 44, 46, 48, 50, 52, 54 of control 16, via control passage 102. The control pressure is generally less than the main pressure. In the illustrated embodiment, the control pressure is generally in the range of about 110 psi.

Main modulator 48 is operably coupled to electronic or electrical control 22 to modulate or control the fluid pressures in main pressure circuit 202 and control pressure circuit 204 as transmission modes, ranges, ratios or operating conditions change. In the illustrated embodiment, main modulator 48 is a normally high solenoid valve with an output pressure generally varying in the range of about 0-110 psi.

Cooler/lube circuit 206 includes a pump 82. Pump 82 distributes fluid to torque converter fluid chamber 94 and cooler fluid chamber 95 via torque converter and torque converter clutch valves 50, 74, 80 and lube relief valve 88. In general, cooler/lube circuit 206 is operable to provide fluid pressure to torque converter 14, maintain the temperature of the hydraulic fluid within a suitable temperature range, and to lubricate various components of transmission 19, such as components of the gear sets including gears and bearings. In the illustrated embodiment, the operating temperature of the hydraulic fluid is generally in the range of about −40 degrees Celsius to about +120 degrees Celsius.

The fluid pressure in cooler/lube circuit 206 is generally less than the main pressure. In the illustrated embodiment, this pressure is in the range of about 100 psi. During "normal" operation in which pumps 81, 82 are drawing fluid from reservoir 84, fluid in suction passage 83 is at a negative pressure. In the illustrated embodiment, the negative pressure is in the range of about −2 psi. Converter relief valve 86 prevents overpressure of torque transferring apparatus 14, during a cold startup, for example.

Exhaust circuit 210 is in fluid communication with valves and actuators of control 16 as shown in FIGS. 2-5. Exhaust pressure is in the range of about zero psi. Exhaust circuit 210 is operably coupled to an exhaust backfill regulator valve 92 as shown. Exhaust backfill regulator valve 92 provides an exhaust backfill pressure, which is generally a pressure to prevent air from entering torque transmitting mechanisms 15, 26 when they are exhausted. In the illustrated embodiment, the exhaust backfill pressure is generally in the range of about 2 psi.

In general, each of the clutch trim systems 30, 32, 34, 36, 38, and flow control systems 180, 182 includes an electro-hydraulic actuator, a hydraulic valve, a pressure switch, and fluid passages and/or chambers. Flow control valve 184 is similarly configured, however, its position is controlled by pressure control system 34. Pressure control system 34 is multiplexed to control both the C4 torque transmitting mechanism and the position of flow control valve 184 as described below.

In the illustrated embodiment, an accumulator, such as accumulator 31 of clutch trim system 30, is in fluid communication with each of the clutch trim systems 30, 32, 34, 36, 38 as shown. Such accumulators or similar devices may be used to hydraulically filter step changes in the output pressure of the respective actuators, or for other purposes. However, it will be understood by those skilled in the art that the inclusion of such accumulators is considered optional.

The electro-hydraulic actuators 30, 32, 34, 36, 38, 40, 42, 44, 46, 48, 50, 52, 54 are operably coupled to control 22 to receive electrical signals (i.e. electrical current) therefrom and selectively actuate their respective valve systems to attain, maintain, or transition between the various operational modes, ranges or ratios of transmission 19. However, for ease of illustration, logical representations of these electrical connections to control 22 have been omitted from FIGS. 2-5.

Each of actuators 30, 32, 34, 36, 38, 40, 42, 44, 46, 48, 50, 52, 54 may be a solenoid valve of an on/off or variable bleed type. In the illustrated embodiment, actuators 52 and 54 are on/off solenoids, while actuators 30, 32, 34, 36, 38, 40, 42, 44, 46, 48, and 50 are of the variable bleed or similar type.

Each of actuators 30, 32, 34, 36, 38, 40, 42, 44, 46, 48, 50, 52, 54 is either of the normally low type or of the normally high type. A normally low (or normally off) solenoid valve provides maximum output pressure when it receives electrical input and provides zero or minimum output pressure when no electrical input is received. For normally low solenoids, when control 22 provides little or no electrical input to the actuator, the output pressure of the actuator is zero, nearly zero psi, or, for VBS solenoids, the output pressure is the exhaust backfill (EBF) pressure.

A normally high (or normally on) solenoid valve provides maximum output pressure when it is not receiving any electrical input and provides zero or minimum output pressure when electrical input is provided. For normally high solenoids, when control 22 provides little or no electrical input to the actuator, the output pressure of the actuator is at or near the input pressure. When control 22 supplies electrical input to the actuator, the output pressure of the actuator is zero or nearly zero psi, or for VBS solenoids, the EBF pressure.

Thus, as used herein, when referring to an actuator or solenoid valve as being "actuated," this means either that electrical input is supplied to the solenoid (as in the case of normally low solenoids) or that electrical input is not supplied to the solenoid (as in the case of normally high solenoids). In the illustrated embodiment, actuators 34, 36, 38 and 48 are normally high solenoids while actuators 30, 32, 40, 42, 44, 46, 50, 52 and 54 are normally low solenoids.

Each actuator has an inlet or actuator feed passage, an exhaust passage, and an actuator output passage. In the illustrated embodiment, all of the actuator feed passages are in direct fluid communication with control passage 102.

Each of the actuator output passages is in fluid communication with a hydraulic valve, such that fluid pressure (or the lack thereof) in the actuator output passage may affect the position of the valve. In general, each of the valves of control 16 includes a valve head, a valve spool, at least one valve land interposed between portions of the valve spool or between the valve head and a portion of the valve spool, and a return spring disposed in a spring chamber. Each valve spool is axially translatable in a valve bore in response to changes in fluid pressure or fluid flow through the various passages of control 16. For ease of illustration, the valve bores have been omitted from the figures.

The valve lands each define a diameter that is greater than the diameter defined by the valve spool, such that surfaces of the lands may slidably engage interior surfaces of the valve bore when the valve spool translates within the valve bore. Spool portions between valve lands may selectively connect fluid passages to other fluid passages, or connect fluid passages to fluid chambers, depending on the position of the valve.

Each return spring biases its respective valve in a first, destroked or spring set position. Changes in fluid pressure or fluid flow in selected fluid passages may cause the valve spool to translate within the valve bore, causing the return spring to partially or fully compress or decompress. Certain of the valves, such as flow control valves 180, 182, 184, are slidable between the first or destroked or spring set position and a second or stroked or pressure set position, where the second or stroked or pressure set position is one in which the return spring is fully compressed. Others of the valves, such as pressure control or trim valves 62, 64, 66, 68, 70, are configured to assume intermediate positions, in which the return spring is partially compressed, in addition to the first and second positions.

Restrictors or orifices, such as orifices 190, 192, may be located or positioned in various fluid passages to alter or moderate the rate of fluid flow through the fluid passages or a portion thereof, in order to control the rate at which pressure in a fluid passage changes or for other reasons. Such restrictors may be used to provide additional control over fluid pressure or the rate of application thereof in the fluid passages and/or fluid chambers.

In the illustrated embodiment, a pressure switch is in fluid communication with each of the clutch trim valves 62, 64, 66, 68, 70, and each of the shift valves 180, 182, 184. Pressure switches 160, 162, 164, 166, 168, 170, 172, 174 detect pressure changes in their respective valve systems, and produce electrical signals in response to the detected pressure. In this way, pressure switches are used to monitor the position of the valves in the valve systems. In the illustrated embodiment, pressure switches 160, 162, 164, 166, 168, 170, 172, 174 are activated by fluid pressure applied to their respective valves 62, 64, 66, 68, 70, 180, 182, 184, to detect the valve position and provide valve position information to control 22. The pressure switches are thereby used to provide diagnostics to control 22 or for other reasons.

If a pressure change is detected at a pressure switch or other sensor, the affected pressure switch or sensor issues an electrical signal to control 22. Such electrical signals inform control 22 of changes in status of components of control 16. In general, pressure switches 160, 162, 164, 166, 168, 170, 172, 174, and other sensors are in electrical or electronic communication with control 22 by suitable electrical wiring, electric networks, and/or wireless channels or links, as will be understood by those skilled in the art. However, for ease of illustration, logical representations of these electrical connections to control 22 have been omitted from FIGS. 2-5.

Torque transmitting mechanisms 15, 26 each have a fluid chamber, i.e., fluid chambers 94, C1, C2, C3, C4, C5, C6, C7, which is selectively pressurized by operation of control 16. Clutch trim systems 30, 32, 34, 36, 38 control the amount and timing of fluid pressure applied to each of the torque transmitting mechanism fluid chambers C1, C2, C4, C6, and C7, respectively, while trim system 50, 74 controls fluid pressure to torque converter clutch 15. Activation of the trim system actuators 30, 32, 34, 36, 38 applies fluid pressure to the C1, C2, C4, C6, and C7 clutch fluid chambers, respectively, thereby resulting in application or release of the respective torque transmitting mechanisms C1, C2, C4, C6, and C7. An exemplary steady state mechanization for control 16 is shown in Table 1 below.

TABLE 1

| RANGE | SHIFT VALVE 180 | SHIFT VALVE 182 | SHIFT VALVE 184 | CLUTCH(ES)/ SHIFT FORK(S) ENGAGED | TRIM SYSTEM(S) ACTIVATED | PRESSURE SWITCHES ACTIVATED |
|---|---|---|---|---|---|---|
| Reverse 2 (High) | 0 | 0 | 0 | C2, C7, 2RA | 32, 38, 40 | 162, 168 |
| Reverse 1 (Low) | 0 | 1 | 0 | C2, C6, 2RA | 32, 36, 40 | 162, 166, 172 |
| Neutral | 0 | 1 | 0 | C6 | 36 | 166, 172 |
| $1^{st}$ | 1 | 1 | 0 | C1, C6, 1A | 30, 36, 44 | 160, 170, 166, 172 |
| $2^{nd}$ | 1 | 1 | 0 | C2, C6, 2A | 32, 36, 42 | 162, 170, 166, 172 |
| $3^{rd}$ | 1 | 1 | 0 | C1, C6, 1B | 30, 36, 46 | 160, 170, 166, 172 |
| $4^{th}$ | 1 | 1 | 1 | C4, C6 | 34, 36 | 164, 170, 174, 166, 172 |
| $5^{th}$ | 1 | 1 | 0 | C2, C6, 2B | 32, 36, 40 | 162, 170, 166, 172 |
| $6^{th}$ | 1 | 0 | 0 | C1, C7, 1A | 30, 38, 44 | 160, 168 170, |
| $7^{th}$ | 1 | 0 | 0 | C2, C7, 2A | 32, 38, 42 | 162, 168, 170 |
| $8^{th}$ | 1 | 0 | 0 | C1, C7, 1B | 30, 38, 46 | 160, 168, 170 |
| $9^{th}$ | 1 | 0 | 0 | C4, C7 | 34, 38 | 164, 168, 170, |
| $10^{th}$ | 1 | 0 | 0 | C2, C7, 2B | 32, 38, 40 | 162, 168, 170 |

In the reverse 2 (high) range, trim systems 32, 38, and 40 are activated and shift valves 180, 182, and 184 are all in the destroked position, enabling main pressure to move the third shift fork to the 2RA position and the C7 torque transmitting mechanism to receive main pressure via fluid passage 220. In the reverse 1 (low) range, the positioning of trim system 40 and shift valve 180 keeps the third shift fork in the 2RA position while trim systems 32 and 36 are activated, and shift valve 182 is stroked, so that the C6 torque transmitting mechanism receives main pressure. In the neutral range, shift valve 182 remains stroked while trim system 36 is activated to supply main pressure to torque transmitting mechanism C6 via fluid passage 236.

In the first, second and third forward ranges, trim system 36 is activated to apply main pressure to torque transmitting mechanism C6 via shift valve 182, which is stroked, while the activation of the shift forks is controlled by the trim systems 42, 44, and 46.

In the fourth forward range, no shift forks are activated. All three shift valves 180, 182, 184 are stroked and main pressure is supplied to torque transmitting mechanisms C4 and C6 via trim systems 34, 36 and fluid passages 224, 226. In the fifth forward range, trim system 40 is activated and shift valve 180 is stroked so that the second shift fork is in the 2B position. Shift valve 182 is stroked and trim systems 32, 36 are activated to supply main pressure to torque transmitting mechanisms C2, C6.

Double transition shifts (when two clutches go off and two clutches come on) are made possible by the configuration of the three shift valves 180, 182, 184 and the three shift forks 98. For example, a shift from $5^{th}$ to $6^{th}$ involves trimming all of the trim systems 30, 32, 36, 38, 40, 42, 44, and 46 at the same time. The hydraulic system architecture allows the trim systems to accomplish the double transition shifts while still providing blocking features to allow safe failure modes.

In the sixth through tenth forward ranges, shift valve 180 is stroked and trim system 38 is activated to supply main pressure to the C7 torque transmitting mechanism. Trim systems 38, 40, 42, 44, 46 control the positioning of the shift forks 98 and trim systems 30, 32, and 34 control the application of main pressure to torque transmitting mechanisms C1, C2, and C4. Trim system 50 controls engagement of the torque converter clutch 15 and is configures so that torque converter clutch 15 may be engaged in any of the ranges.

Linear position sensors are used to monitor the position of the shift forks. Each shift fork is monitored by one linear position sensor. The linear position sensor output combined with the output of the pressure switches may be used by the controller 22 to determine the current range for diagnostic purposes or for other reasons.

The illustrated arrangement of electrohydraulic control 16 thereby provides the ability to perform a four clutch double transition shift, in addition to providing failure recovery features 17 and other features described herein.

Figure 3:
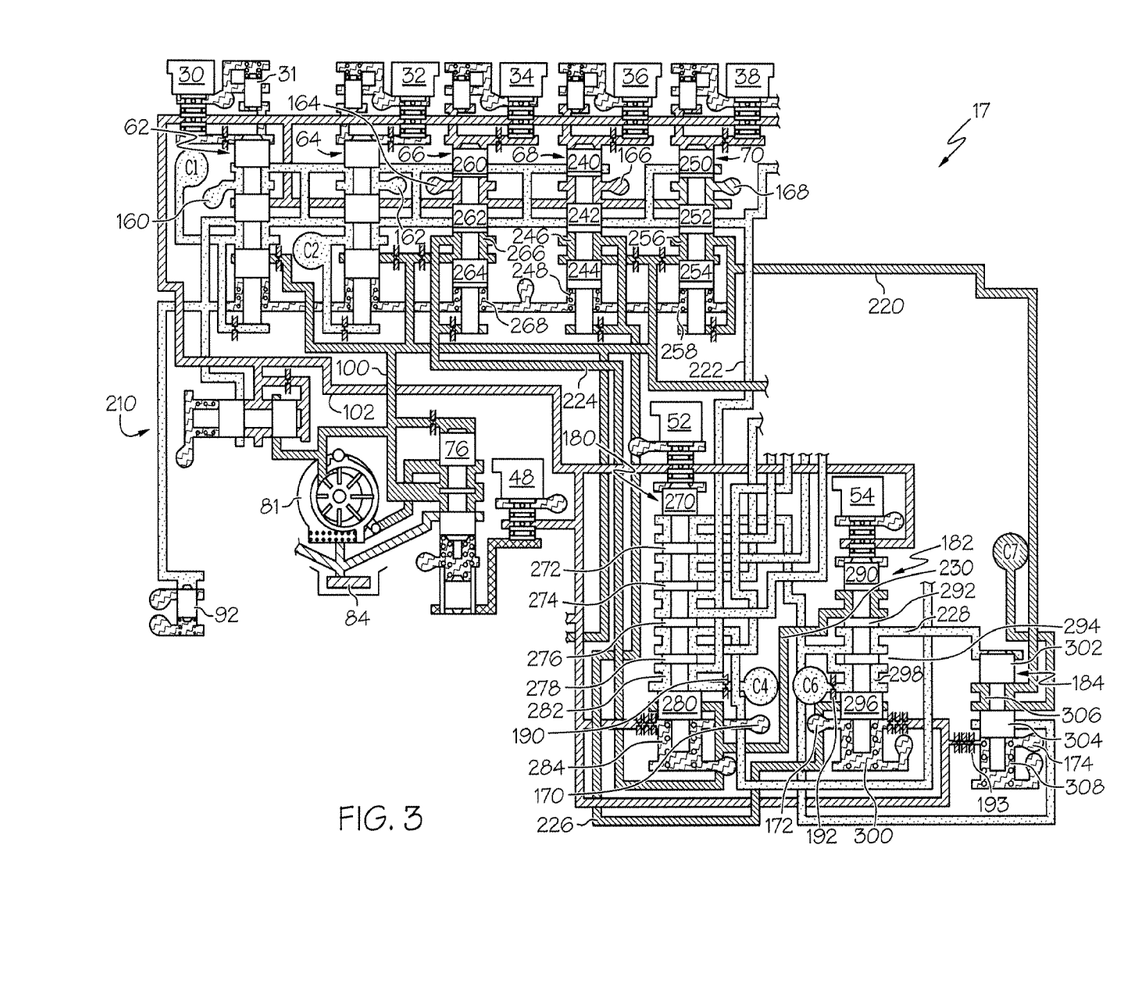
FIG. 3 is a partial schematic diagram of the embodiment of FIG. 2, showing a configuration of fluid passages and fluid pressures for a failure recovery mode when a failure occurs in a reverse (high) range.
Figure 4:
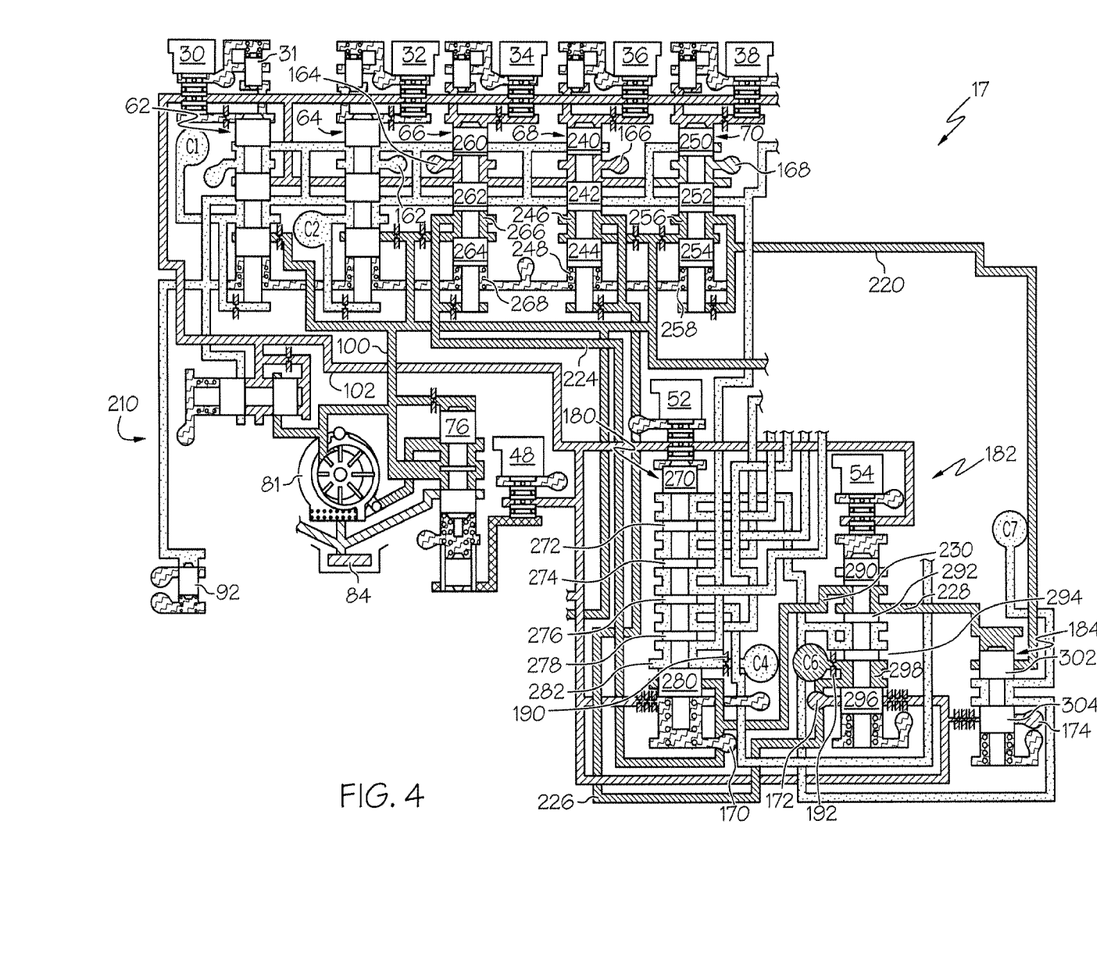
FIG. 4 is a partial schematic diagram of the embodiment of FIG. 2, showing a configuration of fluid passages and fluid pressures for a failure recovery mode when a failure occurs in neutral or a reverse (low) range.

Flow control systems 180, 182, 184 route fluid in control 16 according to the torque transmitting mechanism(s) that are scheduled to be applied or released as determined by control 22. The position of shift valve 180 determines whether trim system 34 is in fluid communication with clutch fluid chamber C4. If a "power off" electrical failure condition occurring when the vehicle is in neutral or a reverse range, shift valve 180 blocks the application of the C4 clutch, even though clutch trim system 34 is actuated (due to being controlled by a normally high solenoid), because shift valve 180 is actuated by a normally low solenoid, actuator 52. As shown in FIGS. 3 and 4, during a power off electrical failure condition occurring in neutral, reverse 1 (low) or reverse 2 (high) range, shift valve 180 is destroked and fluid passage 224 is disconnected from the C4 fluid chamber. Flow control valve 180 also provides multiplexing of shift fork signal pressures as described below.

Figure 6:
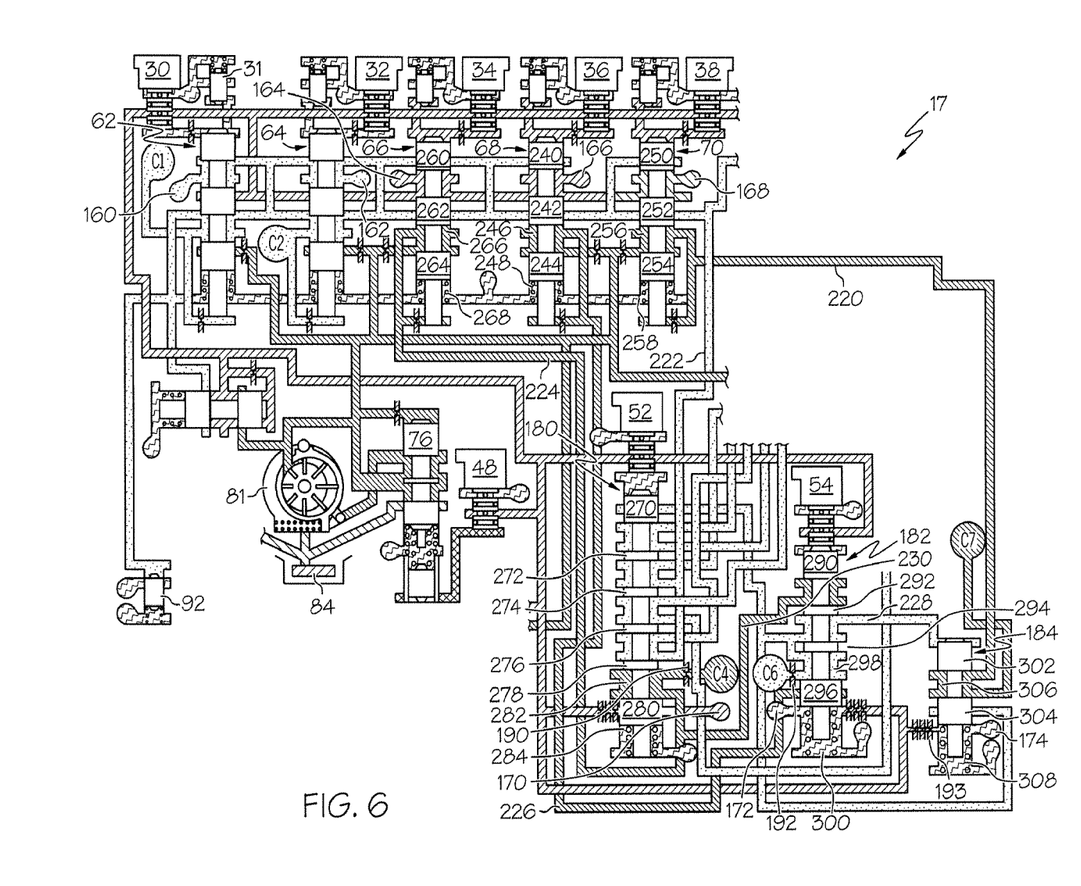
FIG. 6 is a partial schematic diagram of the embodiment of FIG. 2, showing a configuration of fluid passages and fluid pressures for a failure recovery mode when a failure occurs in a high forward range.

The position of shift valve 182 determines whether trim system 36 is in fluid communication with clutch fluid chamber C6. If a power off electrical failure condition occurs when the vehicle is in reverse 2 (high) or an upper forward range (i.e. $6^{th}$ through $10^{th}$ forward ranges), shift valve 182 blocks the application of the C6 clutch. This is so because even though clutch trim system 36 is actuated (due to being controlled by a normally high solenoid), shift valve 182 is actuated by a normally low solenoid, actuator 54. As shown in FIGS. 3 and 6, during a power off electrical failure condition in reverse 2 (high) or a high forward range, shift valve 182 is destroked and fluid passage 226 is disconnected from the C6 fluid chamber.

Figure 5:
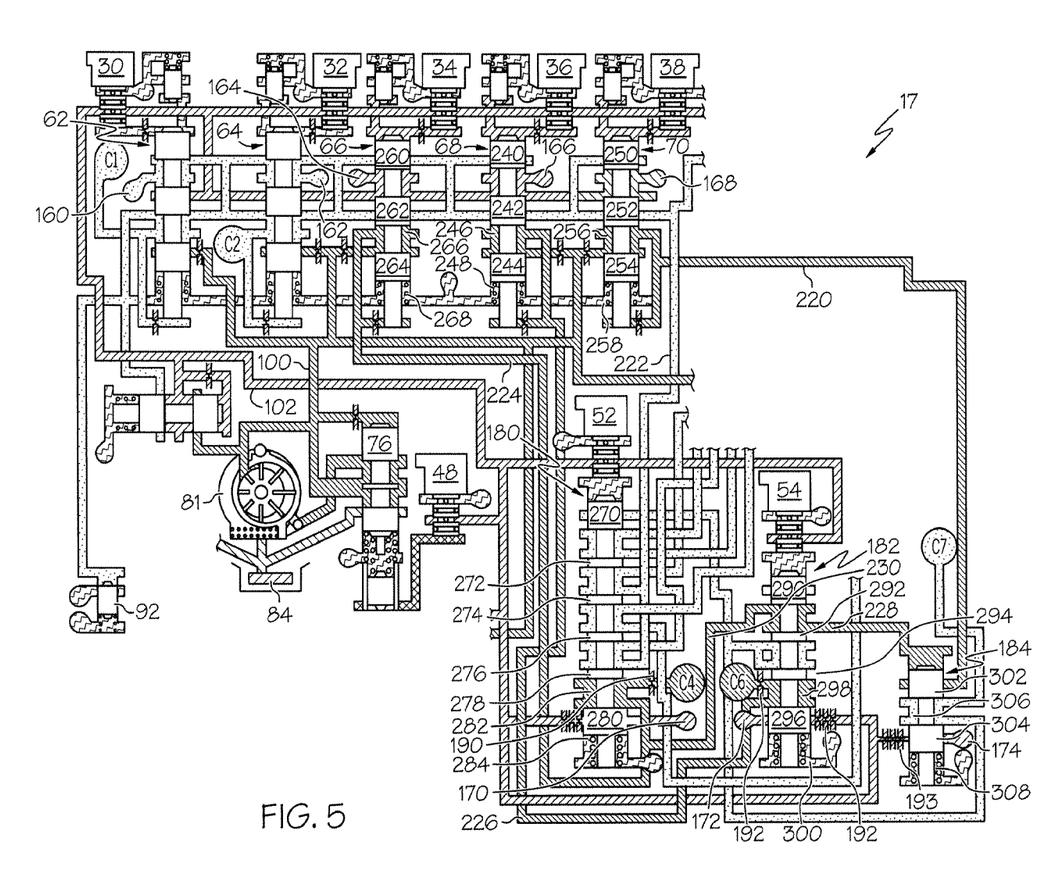
FIG. 5 is a partial schematic diagram of the embodiment of FIG. 2, showing a configuration of fluid passages and fluid pressures for a failure recovery mode when a failure occurs in a low forward range.

The position of shift valve 184 determines whether trim system 38 is in fluid communication with clutch fluid chamber C7. If a power off electrical failure condition that occurs when the vehicle is in neutral, reverse 1 (low), or a low forward range (i.e. 1st through $5^{th}$ forward ranges), shift valve 184 blocks the application of the C7 clutch. This is so because even though clutch trim system 38 is actuated (due to being controlled by a normally high solenoid), shift valve 184's position is controlled by trim system 34, which is also actuated by a normally high solenoid. As shown in FIGS. 4 and 5, during a power off electrical failure condition occurring in neutral, reverse 1 (low) or a low forward range, shift valve 184 is stroked because fluid passage 224 supplies main pressure to the head of shift valve 184 via fluid passage 230, shift valve 182 and fluid passage 228. Main pressure in fluid passage 226 is applied to the differential area of land 296 of shift valve 182. This pressure applied to land 296 is sufficient to keep shift valve 182 stroked, even though actuator 54 is not actuated during the power off failure condition.

Referring to FIG. 2, pressure control valve systems 40, 42, 44, 46 of shift fork control subassembly 196 control the positions of each of the shift forks 98. Pressure control system 40 is multiplexed through flow control valve 180 to control the 2RA and 2A shift fork positions. Pressure control system 42 is multiplexed through flow control valve 180 to control the 2RB and 2B shift fork positions. Pressure control system 44 controls the 1A shift fork position. Pressure control system 46 controls the 1B shift fork position. In each case, a variable bleed solenoid is used to stroke a second stage valve, which applies pressure to the respective end of the shift fork rail to engage the corresponding synchronizer in gearbox 18.

In general, control 16 activates and deactivates the various pressure control or trim systems and flow control systems pursuant to a shift schedule. For example, as shown in FIG. 2, when the vehicle is in the normal neutral range (no electrical failure), electrical signals from control 22 actuate actuators 36 and 54, thereby stroking trim valve 68 and shift valve 182. As a result, main pressure is supplied to clutch chamber C6. An exemplary shift schedule for the illustrated embodiment of transmission 19 is shown in Appendix A.

The failure recovery features 17 relate to the control of certain torque transmitting mechanisms 26 that are normally applied in multiple ranges, when a power off electrical failure condition occurs. In the illustrated embodiment, torque transmitting mechanism C6 is normally applied in the reverse-low, neutral, and low forward ranges (i.e. first through fifth forward ranges), while torque transmitting mechanism C7 is normally applied in the reverse-high and high forward ranges (i.e. sixth through tenth forward ranges) and torque transmitting mechanism C4 is normally applied in the fourth and ninth forward ranges.

To provide power-off failure recovery in the illustrated embodiment, clutch trim systems 34, 36, 38 are actuated by normally high solenoids and are in fluid communication with torque transmitting mechanisms C4, C6 and C7 through shift valves 180, 182, 184, fluid passages 220, 224, 226, 228, 230, and orifices 190, 192 as shown in FIGS. 3-6.

Each of trim systems 34, 36, 38 is actuated by a normally high solenoid, as mentioned above. Trim system 34 is in fluid communication with both shift valve 180 (via fluid passage 224) and shift valve 182 (via branch passage 230). Trim system 36 is in fluid communication with shift valve 182 via fluid passage 226. Trim system 38 is in fluid communication with shift valve 184 via fluid passage 220. Shift valve 182 is in fluid communication with shift valve 184 via fluid passage 228. Control passage 102 is also in fluid communication with the return spring chambers of each of shift valves 180, 182, 184. Restrictors or orifices 190, 192, 193 are interposed between control passage 102 and the return spring chambers as shown.

Each of the trim valves 34, 36, 38 has three spaced-apart lands defining two intermediate fluid chambers. Lands 262, 264 define fluid chamber 266, which is in communication with passage 224 when trim valve 34 is stroked. Land 264 is proximate the return spring chamber 268 relative to lands 260, 262. Lands 242, 244 define fluid chamber 246, which is in communication with passage 226 when trim valve 36 is stroked. Land 244 is proximate the return spring chamber 248 relative to lands 240, 242. Lands 252, 254 define fluid chamber 256, which is in communication with passage 220 when trim valve 38 is stroked. Land 254 is proximate the return spring chamber 258 relative to lands 252, 254.

Shift valve 180 has a plurality of spaced-apart lands 270, 272, 274, 276, 278, 280 defining a plurality of fluid chambers as shown in the figures. Lands 270 and 280 are proportionally larger than lands 272, 274, 276, and 278. Lands 278, 280 define a fluid chamber 282 therebetween, which is in communication with clutch chamber C4, and is in communication with passage 224 when shift valve 180 is stroked. Land 280 is proximate return spring chamber 284, relative to the other lands of shift valve 180.

Shift valve 182 has a plurality of spaced-apart lands 290, 292, 294, 296 defining a plurality of fluid chambers as shown in the figures. Lands 290 and 296 are proportionally larger than lands 292 and 294. Lands 294, 296 define a fluid chamber 298 therebetween, which is in communication with orifice 192 and clutch chamber C6, and is in communication with passage 226 when shift valve 182 is stroked. The diameter of land 296 is larger than the diameter of lands 290, 292, and 294. Land 296 is proximate return spring chamber 300, relative to the other lands of shift valve 182.

Shift valve 184 has spaced-apart lands 302, 304, which define a fluid chamber 306 therebetween. Fluid chamber 306 is in communication with clutch chamber C7. Fluid chamber 306 is in communication with passage 220 when shift valve 184 is destroked. The head of shift valve 184 is proximate land 302, relative to land 304. The valve head is in fluid communication with passage 228 when shift valve 184 is stroked. Land 304 is proximate return spring chamber 308, relative to land 302.

If a power-off electrical failure occurs when the vehicle is operating in the reverse 2 (high) range, application of the power-off failure recovery features 17 will result in torque transmitting mechanism C7 being applied and the vehicle transitioning to the C7-neutral range. The status of control 16 when this scenario occurs is partially shown in FIG. 3. Shift valve 182 is destroked when an electrical failure occurs because it is actuated by a normally low solenoid. When shift valve 182 is destroked, torque transmitting mechanism C6 is no longer in fluid communication with clutch trim system 36 (land 296 intercepts passage 226). Shift valve 180 is also destroked in the event of a power-off electrical failure, because it is actuated by a normally low solenoid. Even though trim systems 34 and 36 are actuated by their respective normally high solenoids, the position of shift valves 180, 182 prevents application of fluid pressure from trim systems 34, 36 to torque transmitting mechanisms C4 and C6. However, actuation of trim system 38 (due to its normally high solenoid) strokes trim valve 70. As a result, main pressure is applied to fluid passage 220. Fluid passage 220 is in fluid communication with torque transmitting mechanism C7 because shift valve 184 is destroked. Shift valve 184 is destroked because fluid passage 228 is at the exhaust pressure. Fluid passage 228 is at the exhaust pressure because shift valve 182 is destroked. The shift valve pressure switches 170, 172, 174 are off because the shift valves 180, 182, 184 are destroked and the respective orifices positioned adjacent the respective valve spring chambers (e.g., the three orifices 193) cause the pressure to drop more quickly as the control pressure flows into the exhaust passage below the valve.

If a power-off electrical failure occurs when the vehicle is operating in the reverse 1 (low) range, application of the failure recovery features 17 will result in torque transmitting mechanism C6 being applied and the vehicle transitioning to the C6-neutral range. The status of control 16 when this scenario occurs is partially shown in FIG. 4. Shift valve 180 is destroked when a power-off electrical failure occurs because it is activated by a normally low solenoid 52. Shift valve 182 is stroked, even though actuator 54 is a normally low solenoid (and therefore not outputting pressure), by main pressure applied to the differential area of land 296 (via passage 226). With shift valve 182 in the stroked position and shift valve 180 in the destroked position, main pressure is applied to the C6 torque transmitting mechanism via fluid passage 226 (due to activation of trim valves 68, 70).

This positioning of shift valves 180, 182 connects branch passages 228, 230 to main pressure via fluid passage 224 and actuation of trim valve 66. Trim valves 66, 68, 70 are activated by normally high solenoids 34, 36, 38. As a result, shift valve 184 is also stroked and pressure switches 172, 174 are activated by control pressure. The shift valve pressure switches are pressurized when the respective shift valve is stroked, because when stroked, the lands 280, 296, 304 block the flow of control pressure to the exhaust passages below the shift valves.

If an electrical failure occurs when the vehicle is operating in one of the low forward ranges (i.e. first through fifth forward ranges), application of the failure recovery features 17 will result in torque transmitting mechanisms C4 and C6 being applied and the vehicle will transition to the fourth forward ratio. The status of control 16 when this scenario occurs is partially shown in FIG. 5. Under normal circumstances, torque transmitting mechanism C6 is applied in each of the low forward ranges via actuation of trim system 36. In the event of an electrical failure, trim system 34 is actuated and supplies fluid at the main pressure to fluid passage 224. Passage 230 is also at the main pressure, due to its connection with passage 224 and because shift valves 182 and 184 are stroked and trim system 38 is actuated. This fluid pressure applied to the differential area of land 280 is sufficient to cause downward translation of shift valve 180 stroked due to the orifice 190 on the C4 clutch. In forward ranges, shift valve 180 is stroked and C4 clutch pressure may or may not be present. If C4 clutch pressure is not present and an electrical failure occurs, then shift valve 180 will begin to destroke. However, trim system 34 will deliver pressure since it is normally high and the size of the C4 clutch orifice 190 will keep the valve stroked even while C4 clutch fills. Trim system 34 is in fluid communication with shift valve 182 via branch passage 230, and shift valve 182 is in fluid communication with shift valve 184 via branch passage 228. As a result, all three shift valves 180, 182, 184 are stroked and torque transmitting mechanisms C4 and C6 are applied.

If an electrical failure occurs when the vehicle is operating in one of the high forward ranges (i.e. sixth through tenth forward ratios), application of the failure recovery features 17 will result in torque transmitting mechanisms C4 and C7 being applied and the vehicle will transition to the ninth forward range. The status of control 16 when this scenario occurs is partially shown in FIG. 6. In the normal operating mode, torque transmitting mechanism C7 is applied in the high forward ranges. Torque transmitting mechanism C7 remains applied in the event of an electrical failure because trim system 38 is actuated by a normally high solenoid. Trim system 34 supplies fluid at the main pressure to fluid chamber C4, via fluid passage 224. Shift valve 182 remains destroked, blocking the flow of pressure to the head of valve 184 via passage 228. Similarly, shift valve 184 remains destroked because passage 228 is exhausted.

Table 2 below summarizes the mechanization of the failure recovery features 17 described above (with "0" denoting destroked, "1" denoting stroked).

TABLE 2

| Ranges | Shift Valve 180 | Shift Valve 182 | Shift Valve 184 | Clutches Applied | Failure Recovery Range | Pressure Switches Activated |
|---|---|---|---|---|---|---|
| Reverse 2 (High) | 0 | 0 | 0 | C7 | Neutral | 164, 166, 168 |
| Neutral or Reverse 1 (Low) | 0 | 1 | 1 | C6 | Neutral | 164, 166, 168, 172, 174 |
| $1^{st}$-$5^{th}$ | 1 | 1 | 1 | C4, C6 | 4th | 164, 166, 168, 170, 172, 174 |
| $6^{th}$-$10^{th}$ | 1 | 0 | 0 | C4, C7 | 9th | 164, 166, 168, 170 |

Thus, as explained above, in the event of a power off electrical failure, transmission 19 fails to neutral if the power off condition occurs in either of the reverse ranges or neutral; and fails to the fourth forward range if the power off condition occurs in any of the $1^{st}$, $2^{nd}$, $3^{rd}$, $4^{th}$ or $5^{th}$ forward ranges, and fails to the ninth forward range if the power off condition occurs in any of the $6^{th}$, $7^{th}$, $8^{th}$, $9^{th}$, or $10^{th}$ forward ranges.

Figure 7:
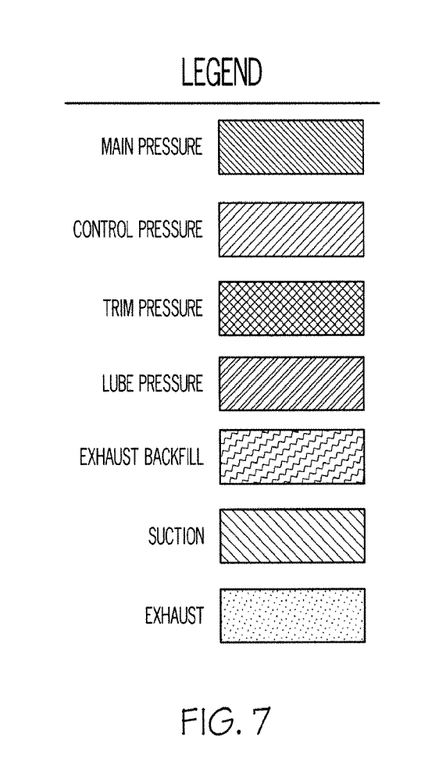
FIG. 7 is a legend showing symbols indicative of various fluid pressures depicted in FIGS. 2-6.

An exemplary shift schedule and other details of the mechanization for the illustrated embodiment are shown in Appendix A of U.S. Provisional Patent Application No. 61/155,980. A legend is provided in FIG. 7 to indicate the various fluid pressures shown in FIGS. 2-6. The present disclosure describes patentable subject matter with reference to certain illustrative embodiments. The drawings are provided to facilitate understanding of the disclosure, and may depict a limited number of elements for ease of explanation. No limits on the scope of patentable subject matter are intended to be implied by the drawings. Variations, alternatives, and modifications to the illustrated embodiments may be included in the scope of protection available for the patentable subject matter.

The invention claimed is:

1. An electro-hydraulic control for a transmission, the electro-hydraulic control comprising a plurality of shift valves movable between a plurality of positions, each shift valve being configured to control engagement of a torque transmitting mechanism of the transmission to enable the transmission to selectively attain a plurality of forward ranges and at least one reverse range, a plurality of trim valves movable between a plurality of positions, the plurality of trim valves comprising a first, a second, and a third trim valve, each one of the plurality of trim valves being in direct fluid communication with at least one of the shift valves, movement of the plurality of trim valves between the plurality of positions being uncontrolled by movement of the plurality of shift valves between the plurality of positions, and a normally-high solenoid valve operably coupled to each one of the plurality of trim valves, wherein (i) the number of shift valves equals the number of trim valves and the number of normally-high solenoid valves equals the number of trim valves, (ii) each normally-high solenoid valve is configured to output a first fluid pressure in response to receiving no electrical input and a second fluid pressure in response to receiving electrical input, and (iii) the first fluid pressure is greater than the second fluid pressure.

2. The electro-hydraulic control of claim 1, wherein (i) the plurality of shift valves includes first, second, and third shift valves, (ii) the first trim valve is in fluid communication with the first and second shift valves, and (iii) the second shift valve is in fluid communication with the third shift valve.

3. The electro-hydraulic control of claim 2, wherein the second trim valve is in fluid communication with the second shift valve.

4. The electro-hydraulic control of claim 3, wherein the third trim valve is in fluid communication with the third shift valve.

5. The electro-hydraulic control of claim 1, further comprising a first fluid passage coupled to a source of main fluid pressure, wherein (i) the plurality of shift valves includes first, second, and third shift valves, (ii) the first fluid passage is in fluid communication with a fluid chamber of the first trim valve when the first trim valve is stroked, (iii) the first fluid passage is in fluid communication with a fluid chamber of the first shift valve when the first shift valve is stroked, and (iv) the fluid chamber of the first shift valve is in direct fluid communication with a fluid chamber of a first torque transmitting mechanism of the transmission.

6. The electro-hydraulic control of claim 5, further comprising a second fluid passage coupled to the first fluid passage, wherein (i) the second fluid passage is in fluid communication with a fluid chamber of the second shift valve when the second shift valve is stroked, and (ii) the second fluid passage is in fluid communication with the fluid chamber of the second shift valve when the second shift valve is destroked.

7. The electro-hydraulic control of claim 6, further comprising a third fluid passage in fluid communication with the fluid chamber of the second shift valve when the second shift valve is stroked, wherein the third fluid passage is in fluid communication with a valve head of the third shift valve.

8. The electro-hydraulic control of claim 7, further comprising a fourth fluid passage coupled to the source of main fluid pressure, wherein (i) the fourth fluid passage is in fluid communication with a fluid chamber of the second trim valve when the second trim valve is stroked, (ii) the fourth fluid passage is in fluid communication with a second fluid chamber of the second shift valve when the second shift valve is stroked, and (iii) the second fluid chamber of the second shift valve is in direct fluid communication with a second torque transmitting mechanism of the transmission.

9. The electro-hydraulic control of claim 8, further comprising a fifth fluid passage coupled to the source of main fluid pressure, wherein (i) the fifth fluid passage is in fluid communication with a fluid chamber of the third trim valve when the third trim valve is stroked, (ii) the fifth fluid passage is in fluid communication with the fluid chamber of the third shift valve when the third shift valve is destroked, and (iii) the fluid chamber of the third shift valve is in direct fluid communication with a third torque transmitting mechanism of the transmission.

10. An electro-hydraulic control for a transmission, comprising
a first plurality of trim valves each operably coupled to a normally-low solenoid valve and each being in direct fluid communication with a fluid chamber of a torque transmitting mechanism of the transmission,
a second plurality of trim valves each operably coupled to a normally-high solenoid valve, the second plurality of trim valves being movable between a plurality of positions, wherein the second plurality of trim valves comprises a first, a second, and a third trim valve,
a plurality of shift valves each being in fluid communication with one of the second plurality of trim valves and each being in direct fluid communication with a torque transmitting mechanism of the transmission, the plurality of shift valves being movable between a plurality of positions, and
at least one valve operable to control at least one shift fork of the transmission,
wherein (i) each one of the second plurality of trim valves is in direct fluid communication with at least one of the shift valves and (ii) movement of the second plurality of trim valves between the plurality of positions is uncontrolled by movement of the plurality of shift valves between the plurality of positions.

11. The electro-hydraulic control of claim 10, wherein (i) one of the second plurality of trim valves is configured to control application and release of a torque transmitting mechanism coupled to a first one of the shift valves, and (ii) the one of the second plurality of trim valves is configured to control the position of a second one of the shift valves.

12. The electro-hydraulic control of claim 10, wherein the at least one valve is configured to control a position of a first shift fork and a position of a second shift fork.

13. The electro-hydraulic control of claim 10, further comprising a plurality of fluid passages connecting the second plurality of trim valves to the plurality of shift valves, the configuration of fluid passages, shift valves, and trim valves being configured to prevent fluid pressure from being applied to a first torque transmitting mechanism of the transmission when the transmission is in a first operating range including one of a neutral range and at least one reverse range.

14. The electro-hydraulic control of claim 13, wherein the configuration of fluid passages, shift valves, and trim valves is configured to prevent fluid pressure from being applied to a second torque transmitting mechanism of the transmission when the transmission is in a second operating range including one a first plurality of forward ranges.

15. The electro-hydraulic control of claim 14, wherein the configuration of fluid passages, shift valves, and trim valves is configured to prevent fluid pressure from being applied to a third torque transmitting mechanism of the transmission when the transmission is in a third operating range including one of a second plurality of forward ranges different from the first plurality of forward ranges.

* * * * *